(12) United States Patent
Tsataros et al.

(10) Patent No.: US 7,201,840 B2
(45) Date of Patent: Apr. 10, 2007

(54) FLUID TREATMENT DEVICE AND COUNTER MECHANISM

(75) Inventors: Eddie J. Tsataros, Tampa, FL (US); Michael Kirchenstiner, Tampa, FL (US)

(73) Assignee: Dart Industries Inc., Orlando, FL (US)

( * ) Notice: Subject to any disclaimer, the term of this patent is extended or adjusted under 35 U.S.C. 154(b) by 391 days.

(21) Appl. No.: 10/778,069

(22) Filed: Feb. 17, 2004

(65) Prior Publication Data

US 2004/0168957 A1   Sep. 2, 2004

Related U.S. Application Data

(62) Division of application No. 09/932,818, filed on Aug. 17, 2001, now abandoned.

(51) Int. Cl.
   *B01D 35/143* (2006.01)
(52) U.S. Cl. .......................................... 210/85; 210/94
(58) Field of Classification Search ............... 215/230; 210/85, 94, 95; 116/273, 274, 316, 285
   See application file for complete search history.

(56) References Cited

U.S. PATENT DOCUMENTS

| | | |
|---|---|---|
| 376,103 A | 1/1888 | Mitchell |
| 5,190,643 A | 3/1993 | Duncan et al. |
| 5,536,394 A | 7/1996 | Lund et al. |
| 5,665,224 A | 9/1997 | Levene et al. |
| 5,785,844 A | 7/1998 | Lund et al. |
| 5,860,387 A * | 1/1999 | Giveen ................. 116/285 |
| 5,873,995 A | 2/1999 | Huang et al. |
| 5,882,507 A | 3/1999 | Tanner et al. |
| 5,900,138 A | 5/1999 | Moretto |
| 6,001,249 A | 12/1999 | Bailey et al. |
| 6,024,867 A | 2/2000 | Parise |
| 6,033,557 A | 3/2000 | Gebhard et al. |
| 6,074,550 A | 6/2000 | Hofmann et al. |
| 6,306,290 B1 | 10/2001 | Rolfes |

OTHER PUBLICATIONS

European Search Report dated Jan. 17, 2003 in EP 02 01 5103.1-2104 (6 pages).

* cited by examiner

*Primary Examiner*—Terry K. Cecil (57) ABSTRACT

This invention relates to a color coded counter mechanism for a fluid treatment filter device which indicates to the consumer when to replace the filter. It also includes a selective pawl follower in the counter mechanism for permitting the filter device to be used in countries having different standards of filtration without requiring a new counter mechanism for each country.

10 Claims, 10 Drawing Sheets

FLUID TREATMENT DEVICE AND COUNTER MECHANISM

CROSS-REFERENCE TO RELATED APPLICATIONS

This application is a divisional of application Ser. No. 09/932,818, filed Aug. 17, 2001 now abandoned, which is incorporated herein by reference.

FIELD OF THE INVENTION

The present invention relates to a fluid treatment device and, more particularly, to a water filter system having a plurality of selective filter usage counter mechanisms for monitoring the number of uses of the replaceable filter cartridge and including a color coding element for visual inspection to permit the user to determine the status of the filter.

BACKGROUND OF THE INVENTION

Fluid treatment devices are known and used in homes for removing contaminants from normal tap water. Since the filters fail to perform after many successive uses, an indicator must be visible and readable to the user to permit the user to determine when to replace a filter.

Duncan, U.S. Pat. No. 5,190,643; Gebhard, U.S. Pat. No. 6,033,557; Tanner, U.S. Pat. No. 5,882,507; Lund, U.S. Pat. No. 5,785,844; Hofman, U.S. Pat. No. 6,074,550; Huang et al., U.S. Pat. No. 5,873,995; Levene, U.S. Pat. No. 5,665,224; Lund, U.S. Pat. No. 5,536,394 and Bailey, U.S. Pat. No. 6,001,249 all pertain to filter systems with an indicator to tell when the filters needs to be replaced. Such devices include float mechanisms, rachet and pawl mechanisms and the like.

OBJECTS AND SUMMARY OF THE INVENTION

It is an object of this invention to provide a device for fluid treatment which will enable the user to determine at any time the status of the filter by color coding. A further object of this invention is to provide a fluid filter usage indicating mechanism which will permit the consumer to change the cycle depending upon the statutory usage required in various countries around the world where replacement filters must be changed according to existing regulations which are known to vary from country to country.

Yet another object of this invention is to provide a unit which is readily assembled and will not dislodge, tilt, come apart or disintegrate under adverse conditions.

Still a further object of this invention is to provide a filter unit in which color coding is used which will not scratch or bleed off during use or washing. This is particularly true where dishwashers are used which might cause the color dyes on the system to be washed away or otherwise destroyed.

Yet another object of this invention is to provide fluid treatment mechanisms which will fully drain all liquid from the assembly after it is immersed and washed.

Yet another object of this invention is to provide a filter cartridge mechanism which will operate when the cap is replaced regardless of the orientation of the placement.

Another object of this invention is to provide a fluid filter mechanism which will have a minimum useful life of at least 3,000 cycles at one filter change setting or 7,000 cycles at another filter change setting depending upon the country of use thus permitting up to approximately 9.6 years of use if the product is used twice a day.

Yet a further object of this invention is to permit the replacement mechanism to indicate when the filter cartridge must be replaced when the amount of water discharged through the cartridges is at least about 80% of the approved capacity of the cartridges.

Still a further object of this invention is to provide a fluid filter mechanism which cannot be disassembled except by destruction of the item, thus avoiding accidental loosening of parts which might fall off during washing or other uses.

Yet another object of this invention is to permit the counter mechanism to accurately count the number of times the container has been filled.

In summary, this invention relates to a fluid treatment and filter counter mechanism which monitors the number of uses of the filter cartridge indicating when it must be replaced, such as by, for example, color coding. The counter mechanism also includes a plurality of selective filter counter mechanisms depending upon the requirements of a particular country.

It will be appreciated that relative terms such as left, right, up, down, clockwise, and counterclockwise are for convenience only and are not intended to be limiting.

These objects and summary will be understood from a detailed reading of the following description including the drawings which are as follows:

Figure 1:
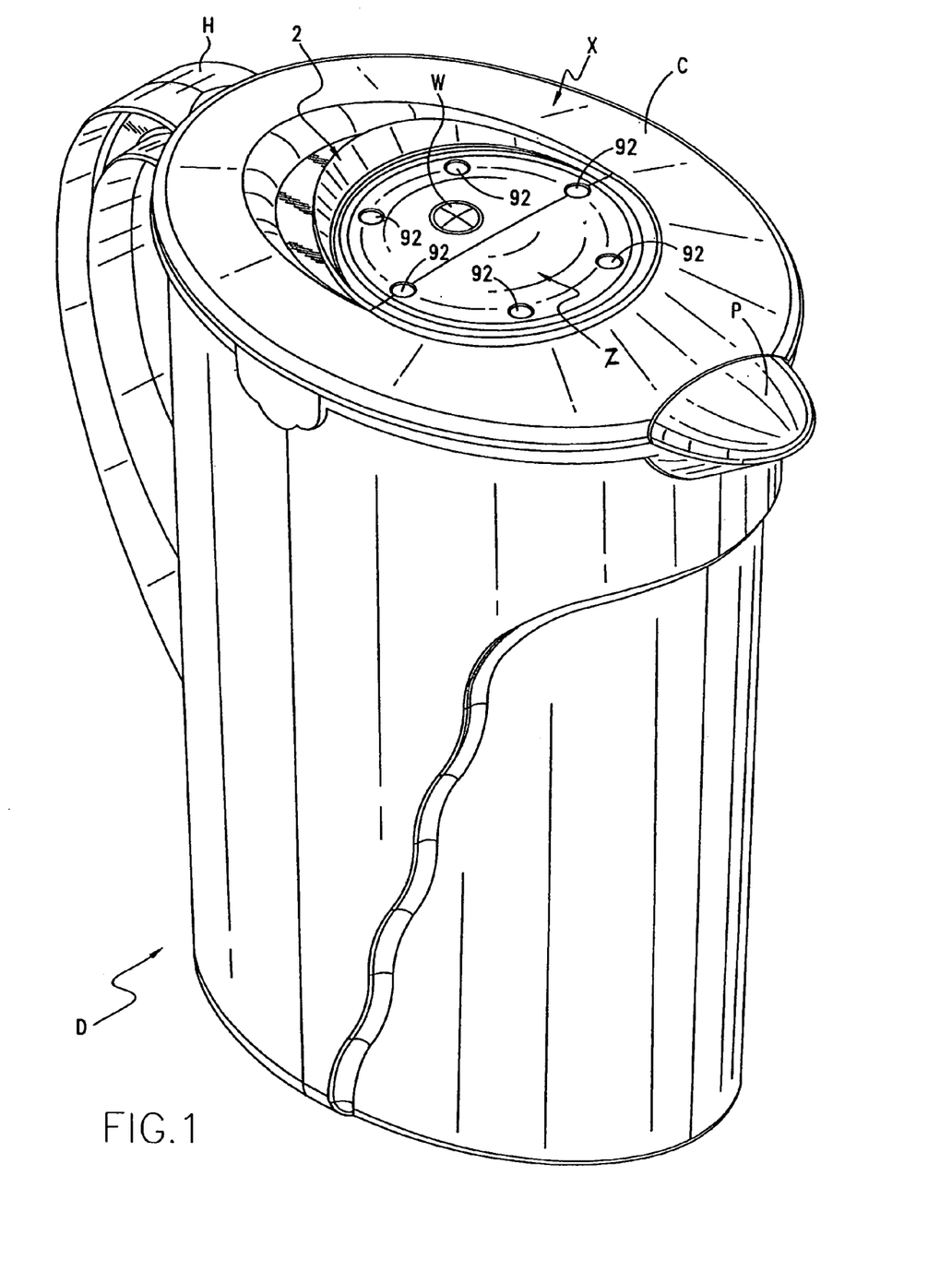
FIG. 1 is perspective view of a fluid treatment device.
Figure 2:
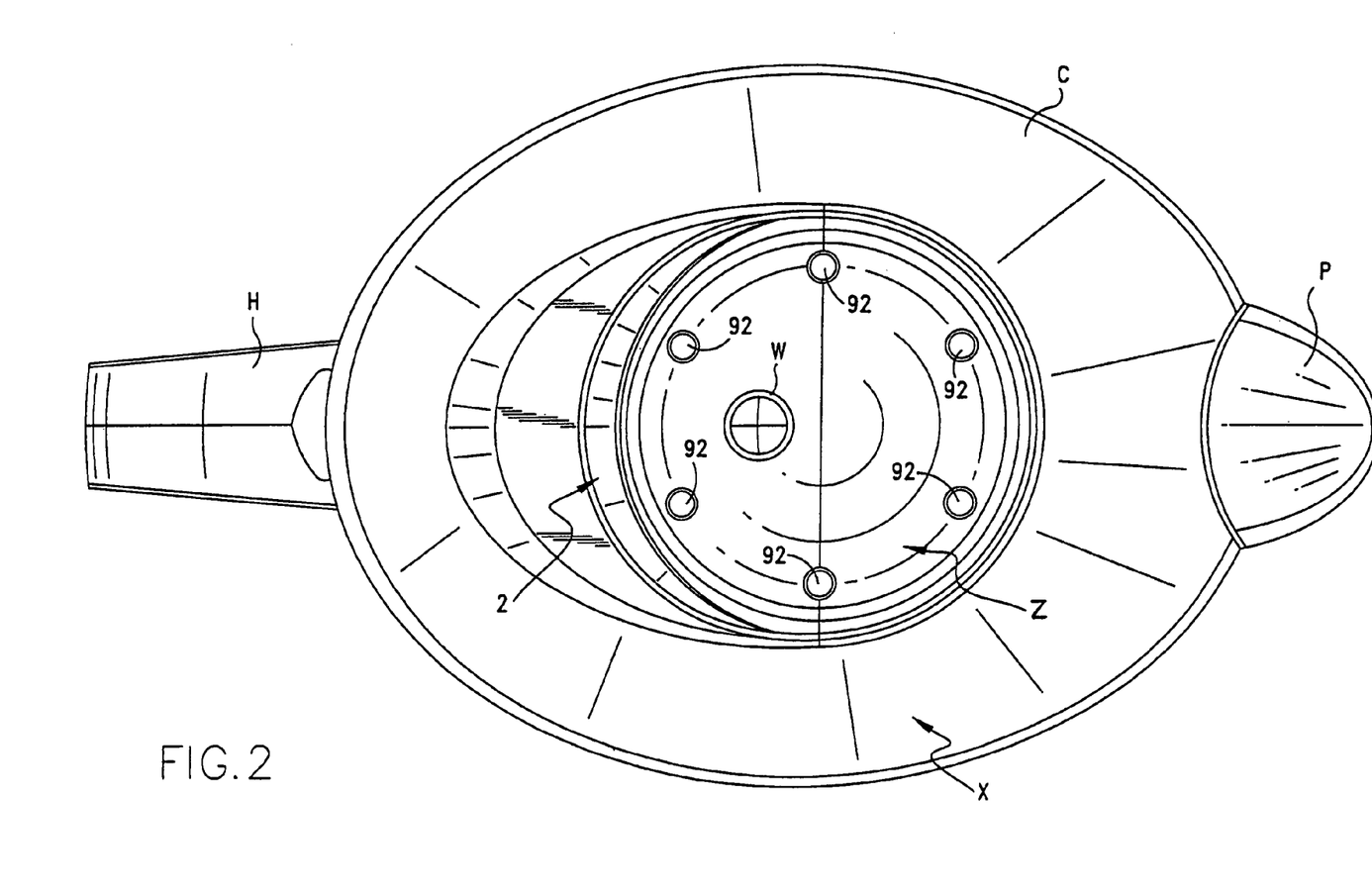
FIG. 2 is top plan view of a fluid treatment device.
Figure 3:
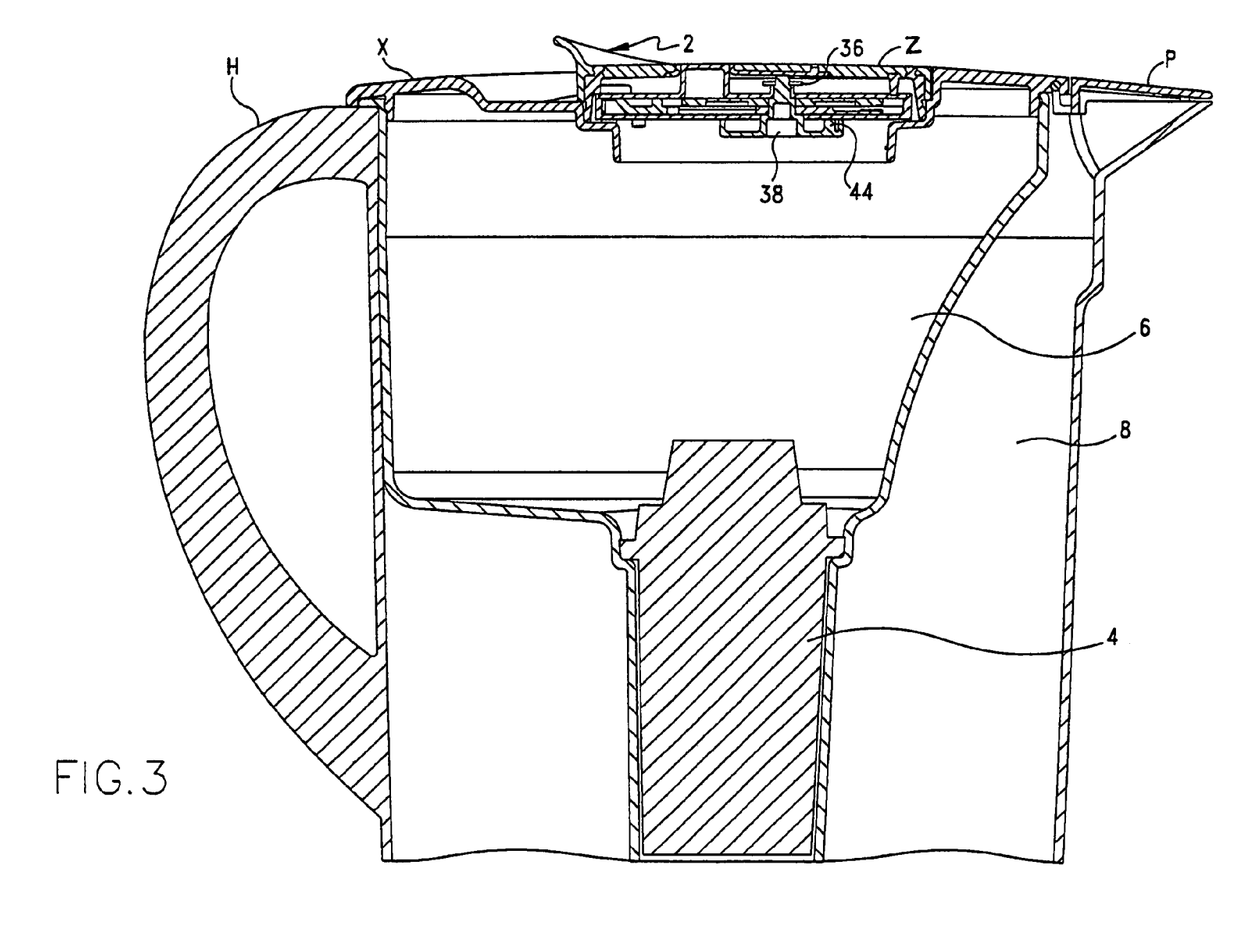
FIG. 3 is fragmentary cross-sectional side.

DETAILED DESCRIPTION OF THE INVENTION FIGS. 1, 2, and 3

FIGS. 1, 2, and 3 show a fluid treatment device D. The fluid treatment device D has a removable and replaceable cap C having an outer lid X and an inner lid Z.

In the embodiment shown, the removable and replaceable cap C has a generally elliptical shape. The device D includes a pouring spout P which is formed and extends along one side thereof and a handle H on the opposite side thereof. A lip 2 is formed on the removable and replaceable inner lid Z. A window W located on the removable and replaceable cap C for viewing a painted consumer indicator dial is subsequently described.

FIG. 3 shows a filter 4 placed between first chamber 6 and second chamber 8. When the consumer wants to drink filtered water, the consumer lifts lid Z, and unfiltered water is poured into first chamber 6, the water goes through filter 4 and into the second chamber 8, thereby being filtered.

FIGS. 4 through 15

Figure 4:
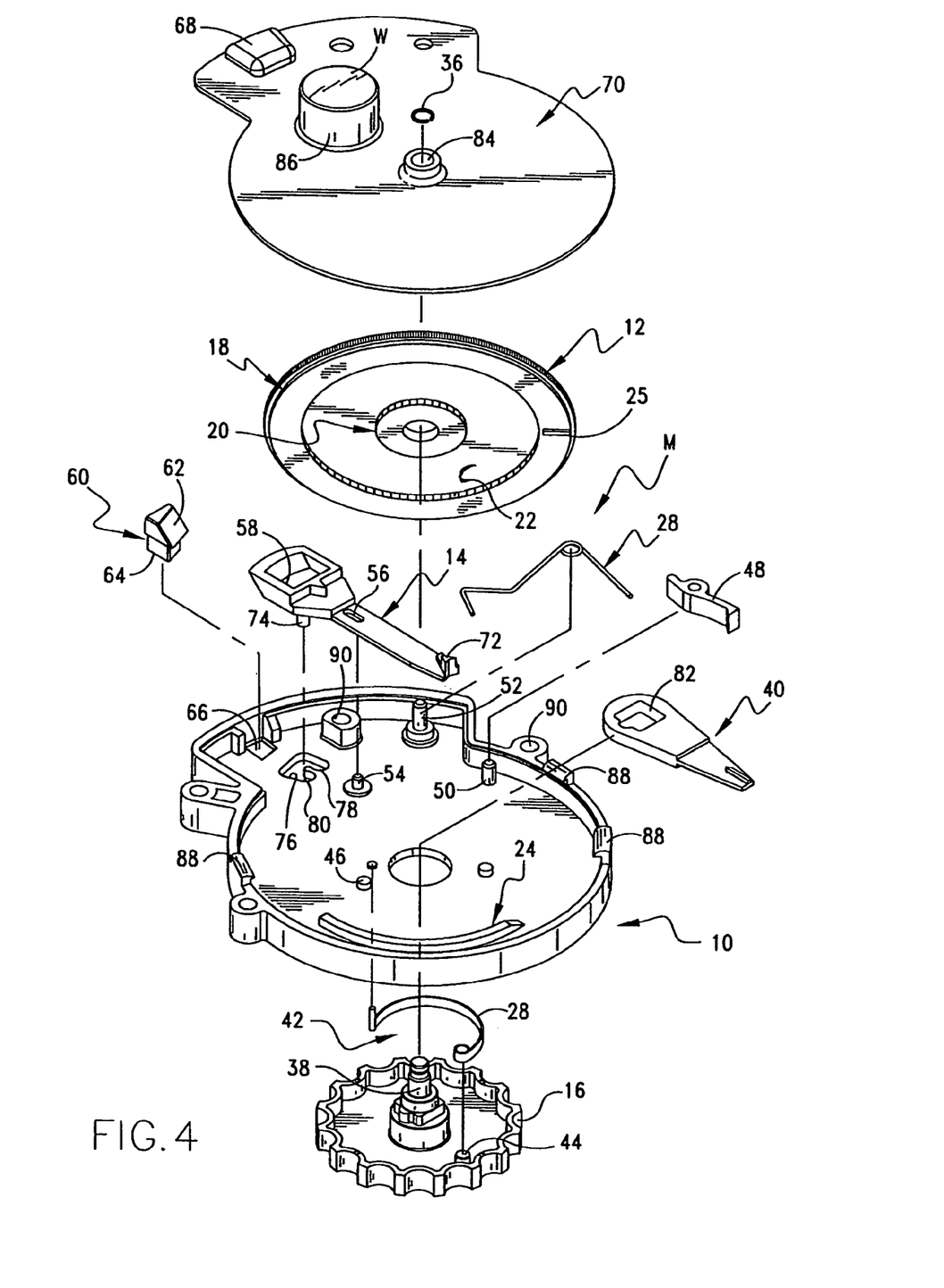
FIG. 4 is exploded view of the assembly.

FIG. 4, shows a chassis bottom cover 10 of mechanism M.

Figures 5, 6:
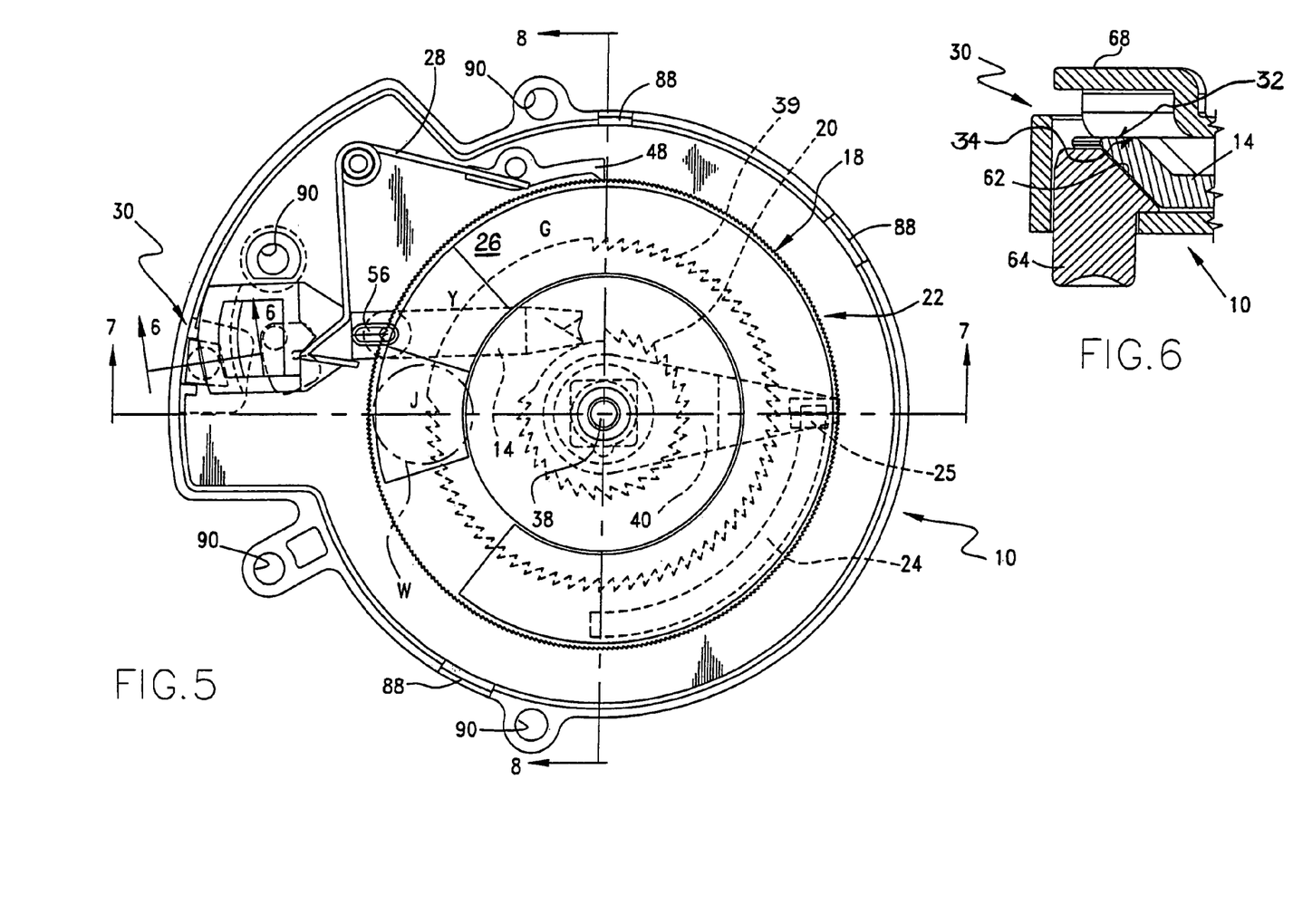
FIG. 5 is top plan view of the chassis assembly with portion shows in phantom line and showing color coding.
FIG. 6 is fragmentary cross-section enlarged takes along the line 6—6 of FIG. 5 and viewed in the direction of the arrows.
Figure 7:
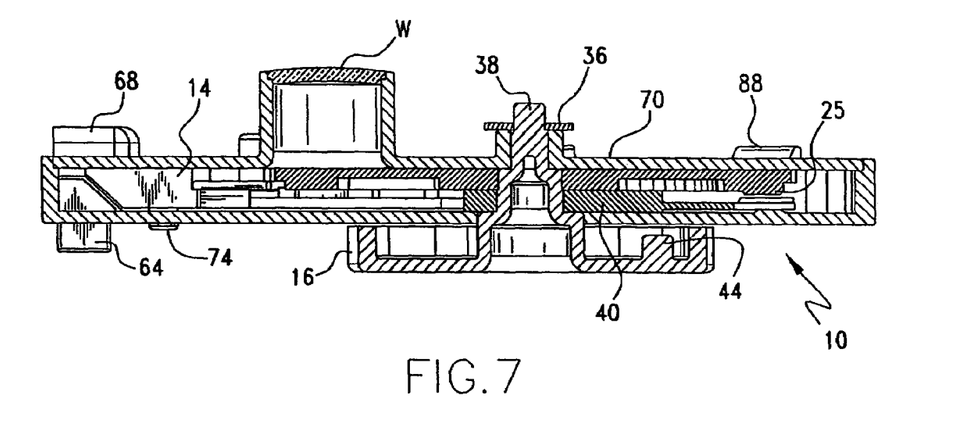
FIG. 7 is fragmentary cross-section taken along line 7—7 of FIG. 5 and viewed in the direction of the arrows.
Figure 8:
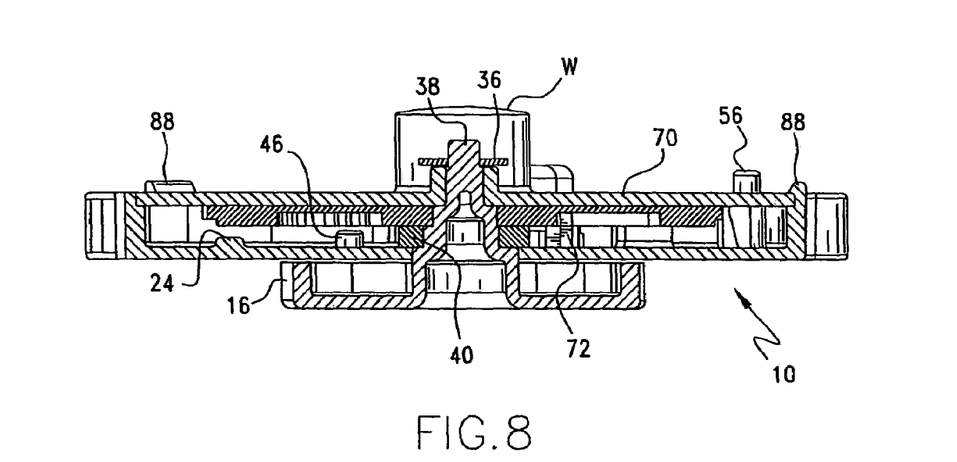
FIG. 8 is fragmentary cross-section taken along line 8—8 of FIG. 5 and viewed in the direction of the arrows.
Figure 9:
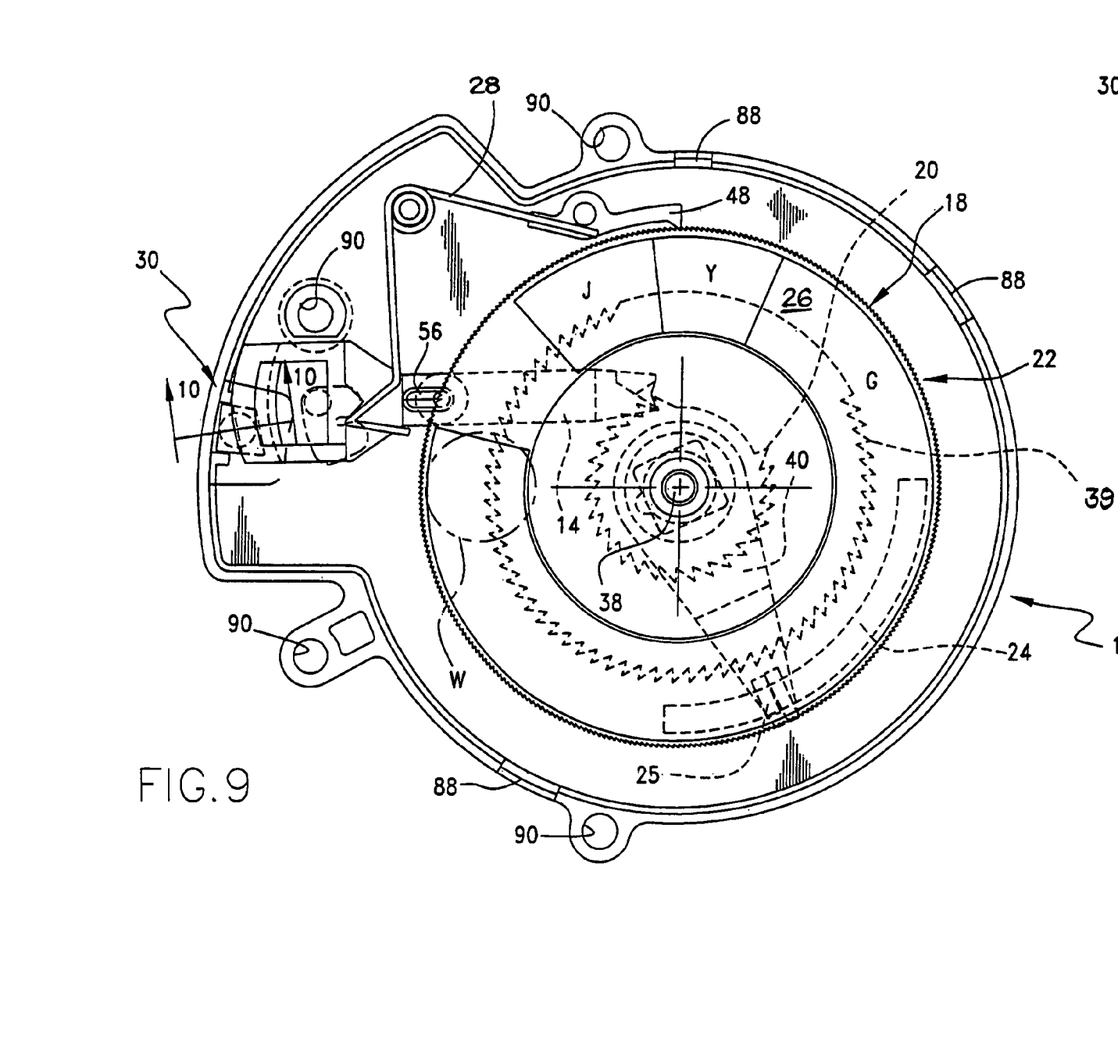
FIG. 9 is top plan viewed of the chassis assembly with portions show in phantom lines indicating one position of the pawl.
Figure 10:
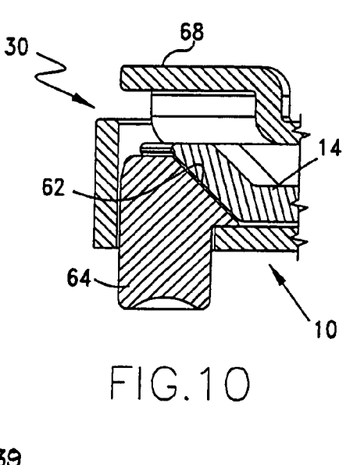
FIG. 10 is fragmentary cross-section enlarged take along the line 10—10 of FIG. 9 and viewed in the direction of the arrows.
Figures 11, 12:
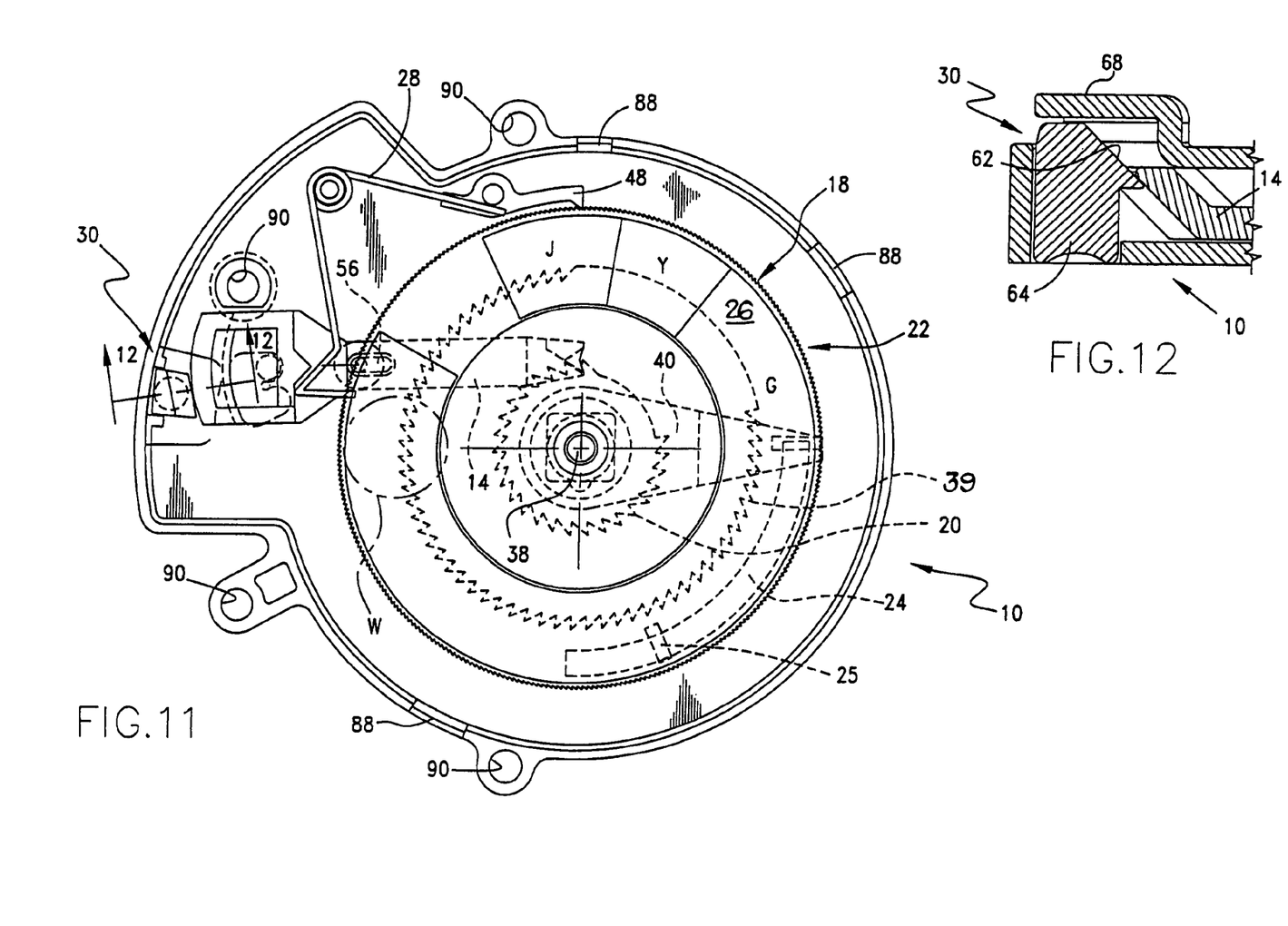
FIG. 11 is top plan view of the chassis assembly with portion shows in phantom lines.
FIG. 12 is fragmentary cross-section enlarged takes along the line 12—12 of FIG. 11 and viewed in the direction of the arrows.
Figure 13:
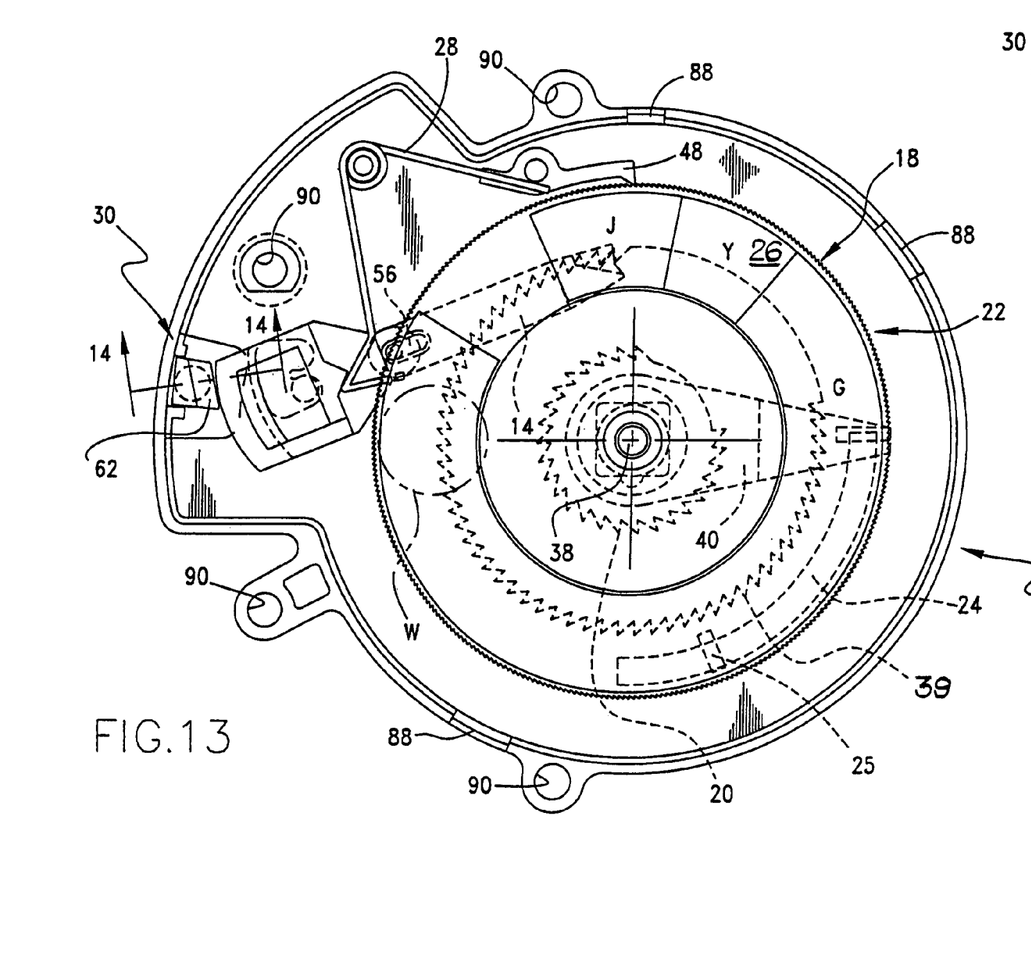
FIG. 13 is top plan viewed of the chassis assembly with portion shows in phantom lines and indicating another position of the pawl.
Figure 14:
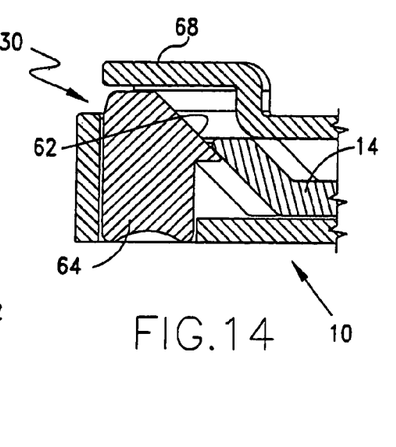
FIG. 14 is fragmentary cross-section enlarged takes along the line 14—14 of FIG. 12 and viewed in the direction of the arrows.
Figure 15:
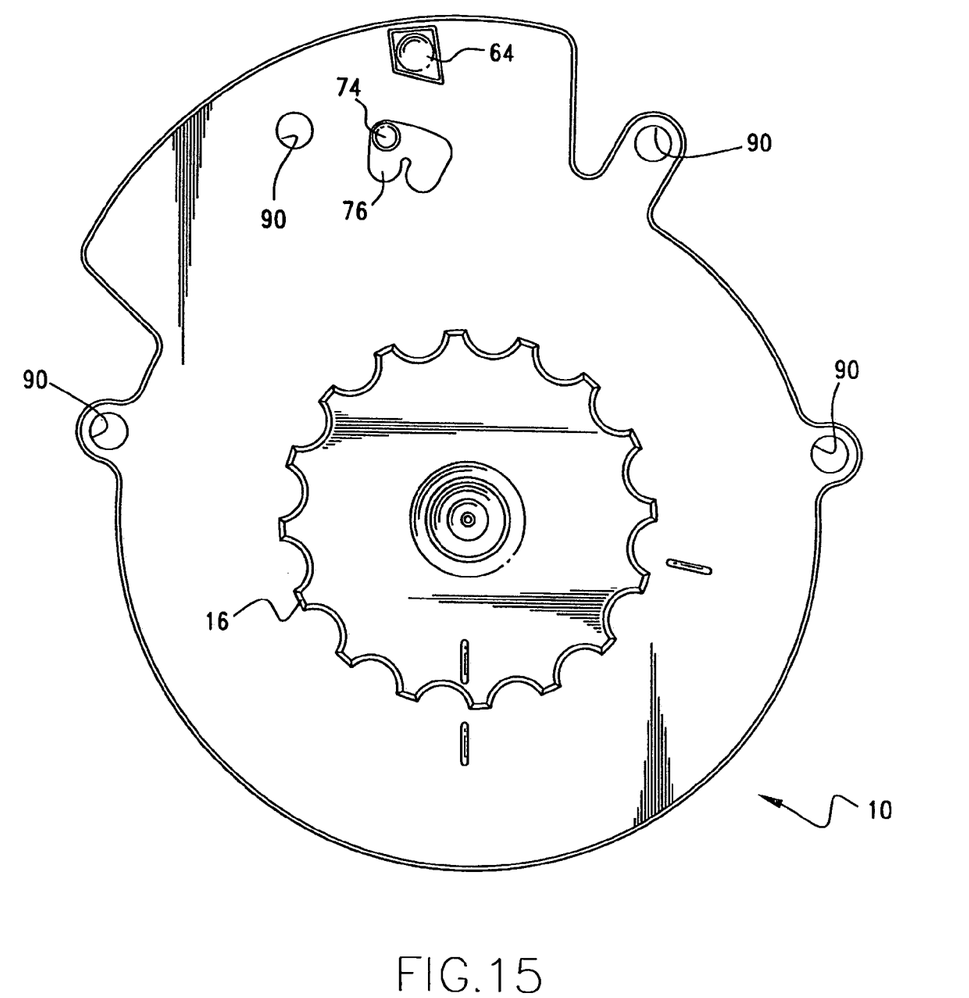
FIG. 15 is bottom plan view of water treatment chassis.

The chassis 10 comprises a gear and ratchet plate 12 and pawl follower 14 and a hub 16. The gear and ratchet plate 12 is secured to the hub 16 by a lock washer 36 or a nut or other fastener. The gear and ratchet plate 12 includes gear teeth 18, a plurality of ratchet wheels 20 and 22, a slot 24, a stop 25 and color indicator 26 (FIG. 5). A return spring 28 engages with the gear teeth 18 causing the gear teeth 18 to go counterclockwise. The follower 14 can be set at the large diameter ratchet wheel 20 or can be set at the smaller diameter 22, depending on the filter cycle used.

FIG. 6 shows the pawl follower 14 and an enlarged fragment 30 of this assembly. A portion 32 rides over portion 34 and, when depressed, indexes either ratchet wheel 20 or ratchet wheel 22. The lock washer 36 locks spindle 38 so every part will be secured when the lid Z is removed or replaced on the cap C.

Follower 14 is positioned on the teeth 39 of gear 22. A return arm 40 is set at the end of slot 24. A reset spring 42 is positioned on pin 44 and engages in hole 46. A pawl 48 mounted on pin 50 engages teeth 18 of the gear and ratchet plate 12. The return arm 40 is fixed on spindle 38. The reset spring 42 is mounted on pin 52. Pawl followers 14 is mounted on pin 54 and has a slot 56. An opening 58 in the pawl and ratchet 14 engages a push button 60 having a cam top 62 and a bottom projection 64 which enters opening 66. The button 60 is received in a cap 68 of a chassis cover 70.

Bottom projection 64 is raised upwardly into opening 58 causing the pawl and ratchet 14 to moved on pin 54 positioned on slot 56 to index a pawl 72. Pawl and ratchet 14 can be shifted from gear 20 to gear 22, when a pin 74 is moved in a slot or opening 76 from one position 78 to another position 80.

It is possible to provide more concentric ratchet wheels than the two shown and additional slots in the opening 76. The return arm 40 is provided with an opening 82 and mounted on the spindle 38 extending to the gear and ratchet plate 12. The return arm 40 exits from the chassis cover 70 and an opening 84 and is secured by lock washer 36. Cover chassis 70 has a view sleeve 86 with window W. The cover chassis 70 is locked by means of snap members 88 to the chassis. Hub handle 16 is rotated in order to reset the gear and ratchet plate 12. Each time the chassis 10 and its assembly are indexed the selective ratchet wheel 20 or 22 causes the color coding indicator 26 on the gear and ratchet plate 12 to be exposed to the window W. As will be noted in FIGS. 5, 9, and 11, color runs from green in the lighter area G to the darker yellow Y to darkest area red J, thus indicating to the consumer the status of the filter in the device D. Holes 90 mounted with bolt 92 keep the chassis cover on cap C tight.

Operation

In the operation of the fluid treatment device D, the hub 16 is rotated substantially until the green color indicates at the window W. This begins the sequence of operation of the ratchet and pawl mechanism 20 and 22 depending on which one is used. The pin 74 shifts from position 78 to position 80 in order changes the gearing counter mechanism.

While this invention has been described as having preferred design, it is understood that it capable of further modification, uses and/or adaptations following in general the principle of the invention and including such departures from the present disclosure as come within known or customary practice in art to which the invention pertains, and as may be applied to the essential features set forth, and fall within the scope of the invention or the limits of the appended claims.

We claim:

1. In a fluid treatment device of the type comprising a container, said container having a filter, and said container having first and second chambers, the improvement wherein:
   a) said filter is positioned in said first chamber;
   b) a connecting element is provided, said connecting element being configured for connecting said first chamber to said second chamber for permitting fluid to travel from said first chamber though said filter and into said second chamber;
   c) a removable and replaceable cap is provided for said first chamber;
   d) said removable and replaceable cap has a gear counter mechanism;
   e) a ratchet indexing element is provided on said removable and replaceable cap for indexing said gear counter mechanism when said removable and replaceable cap is replaced after said removable and replaceable cap has been removed for refilling said first chamber;
   f) said gear counter mechanism includes a gear having a sequentially changing visual color coding system for indicating the present status of the filter;
   g) said visual color coding system has at least two color changes;
   h) said gear counter mechanism indicating when to replace said filter and having at least two selective counter cycles, each cycle having a unique maximum number of cap replacements, said at least two selective counter cycles including at least two ratchet wheels, and a shiftable, selective pawl follower provided for selecting one of said at least two ratchet wheels;
   i) said cap has a window for viewing said sequentially changing visual color coding system;
   j) said removable and replaceable cap has a top and bottom; and
   k) said ratchet indexing element includes a hub handle on the bottom of said cap for indexing when said cap is removed.

2. A fluid treatment device as in claim 1, and wherein:
   a) said visual color coding system includes green, yellow, and red color codes.

3. A fluid treatment device as in claim 2, and wherein:
a) said green, yellow, and red color codes are in sequence starting with green and ending with red.

4. In a fluid treatment device as in claim 1, and wherein:
a) said at least two ratchet wheels are stacked one on top of the other.

5. In a fluid treatment device as in claim 1, and wherein:
a) said sequentially changing visual color coding system is arcuately positioned on said gear counter mechanism.

6. In fluid treatment device of the type comprising a container, said container having a filter, said container having first and second chambers the improvement wherein:
a) said filter is positioned in said first chamber;
b) a connecting element connects said first chamber to said second chamber for permitting fluid to travel from said first chamber though said filter and into said second chamber;
c) a removable and replaceable cap is provided for said first chamber;
d) said removable and replaceable cap has a counter mechanism;
e) an indexing element is provided on said removable and replaceable cap for indexing said counter mechanism when said removable and replaceable cap is replaced after said removable and replaceable cap is removed for refilling said first chamber; and
f) said counter mechanism indicating when to replace said filter and having at least two selective counter cycles, each cycle having a unique maximum number of cap replacements, said at least two selective counter cycles including at least two ratchet wheels, and a shiftable, selective pawl follower provided for selecting one of said at least two ratchet wheels.

7. A fluid treatment device as in claim 6, and wherein;
a) said counter mechanism includes a visual color coding system including at least two color changes.

8. In a fluid treatment device as in claim 6, and wherein:
a) said counter mechanism includes a button release to provide shifting of said selective pawl follower from one of said at least two ratchet wheels to the other of said at least two ratchet wheels.

9. A device for use in a fluid treatment device of the type having a removable filter, the device comprising;
a) a removable and replaceable cap;
b) said removable and replaceable cap having a counter mechanism;
c) an indexing element on said removable and replaceable cap for indexing said counter mechanism when said removable and replaceable cap is replaced after said removable and replaceable cap is removed for refilling said first chamber; and
d) said counter mechanism indicating when to replace said filter and having at least two selective counter cycles, each cycle having a unique maximum number of cap replacements, said at least two selective counter cycles including at least two ratchet wheels, and a shiftable, selective pawl follower provided for selecting one of said at least two ratchet wheels.

10. A device for use in a removable device having a removable filter as in claim 9; and wherein:
a) said counter mechanism includes a sequentially changing visual color coding system having green, yellow and red color codes.

* * * * *